US005490480A

United States Patent [19]
Dumond

[11] Patent Number: 5,490,480
[45] Date of Patent: Feb. 13, 1996

[54] SQUIRREL-INHIBITING SHIELD FOR A BIRD FEEDER

[76] Inventor: Gilbert Dumond, 76 Golden Hill Rd., Danbury, Conn. 06810

[21] Appl. No.: 365,671

[22] Filed: Dec. 28, 1994

[51] Int. Cl.$^6$ ................................................ A01K 39/01
[52] U.S. Cl. .................................... 119/57.9; 119/23
[58] Field of Search ................................ 119/57.8, 57.9, 119/52.2, 52.3, 23; 52/101

[56] References Cited

U.S. PATENT DOCUMENTS

| | | | |
|---|---|---|---|
| 2,591,459 | 4/1952 | Meany | 119/52.3 |
| 3,049,093 | 8/1962 | Oliver. | |
| 3,482,549 | 12/1969 | Episcopo | 119/57.9 |
| 4,188,913 | 2/1980 | Earl et al.. | |
| 4,259,927 | 4/1981 | Clark. | |
| 4,328,636 | 5/1982 | Johnson. | |
| 4,356,793 | 11/1982 | Blasbalg. | |
| 4,541,362 | 9/1985 | Dehls. | |
| 4,628,865 | 12/1986 | Lehmann. | |
| 4,646,686 | 3/1987 | Furlani. | |
| 4,846,110 | 7/1989 | Reynolds | 119/23 |
| 4,974,547 | 12/1990 | Graham. | |
| 5,062,388 | 11/1991 | Kilham. | |
| 5,215,039 | 6/1993 | Bescherer. | |
| 5,228,410 | 7/1993 | Parker | 119/23 |
| 5,269,242 | 12/1993 | Toldi. | |

FOREIGN PATENT DOCUMENTS

| | | | |
|---|---|---|---|
| 157822 | 2/1957 | Sweden | 119/23 |

*Primary Examiner*—Todd E. Manahan
*Attorney, Agent, or Firm*—Clifford L. Tager

[57] ABSTRACT

The present invention is directed to a shield capable of inhibiting squirrels from eating bird seed from a bird feeder. The present invention comprises an enclosure having a cavity capable of housing bird seed, a perch attached to the enclosure and located below the hole, and a shield located offset from and substantially in front of the hole and in proximity to the perch. The shield preferably has three substantially U-shaped members capable of inhibiting squirrels from eating the bird seed through the hole. A structure is preferably attached between the enclosure and the shield to secure the shield in its offset position, and preferably comprises a first segment attached between the first and second terminal ends of the first U-shaped member, and a second segment attached between the first and second terminal ends of the third U-shaped member. These first and second segments further inhibit a squirrel from accessing the hole in the bird feeder. The bird feeder optionally also comprises a canopy attached to the enclosure and located above the hole and in proximity to the shield. The canopy further inhibits squirrels from eating the bird seed through the hole, as well as substantially protects the hole from rain.

19 Claims, 2 Drawing Sheets

U.S. Patent     Feb. 13, 1996     Sheet 1 of 2     5,490,480
FIG. 1
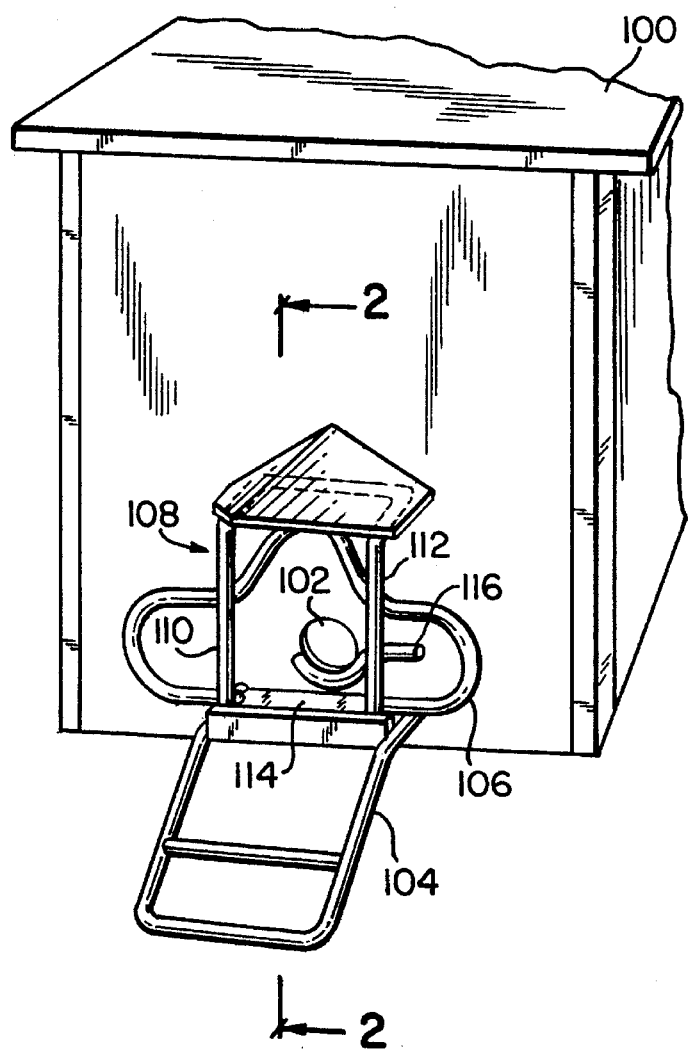
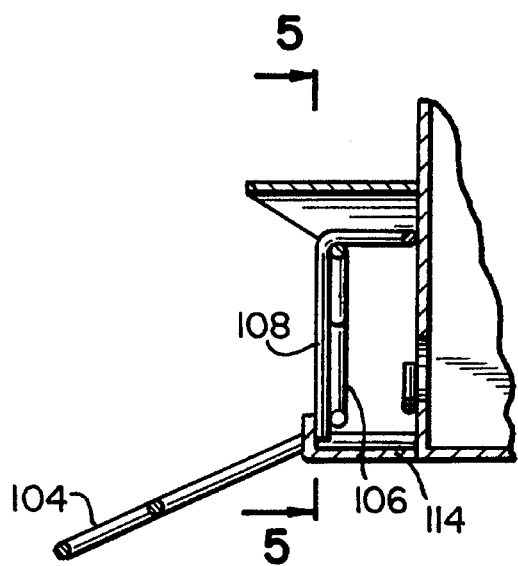
FIG. 2
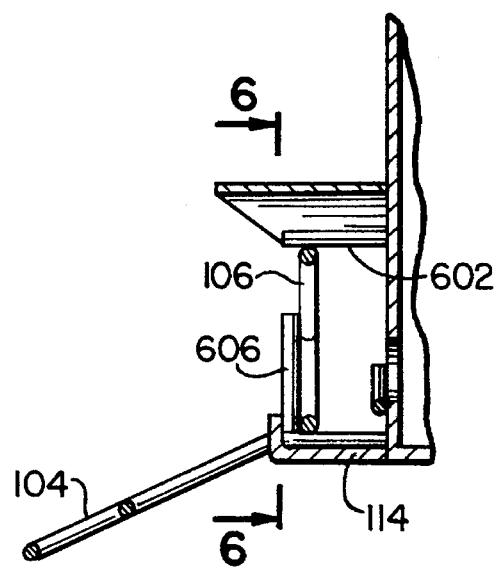
FIG. 2A

5,490,480

SQUIRREL-INHIBITING SHIELD FOR A BIRD FEEDER

BACKGROUND OF THE INVENTION

1. Technical Field

The present invention is directed to bird feeders. More specifically, the present invention is directed to a shield capable of inhibiting squirrels from eating bird seed from a bird feeder.

2. Background Information

Devices for inhibiting squirrels from eating bird seed from a bird feeder are well known. Typical devices include a cone-shaped plate located either above or below a bird feeder to block the path of the squirrel to the feeder. Squirrels, however, tend to easily by pass these plates.

Other devices include a mechanical system, coupled to a perch, which operates to close off access to the bird seed if the weight placed on the perch is greater than the weight of the birds to be fed. Thus, a squirrel's weight will close the gate to the bird feeder, denying the squirrel access thereto. Being mechanical systems, however, the parts thereof are subject to malfunction, as well as to corrosion by the elements.

SUMMARY OF THE INVENTION

The present invention is directed to a shield capable of inhibiting squirrels from eating bird seed from a bird feeder. In the preferred embodiment, the present invention comprises an enclosure having a cavity capable of housing bird seed. The enclosure has a hole to allow bird seed housed in the cavity to escape therefrom, thereby providing the birds access to the seeds. A perch is attached to the enclosure and located below the hole. The perch is capable of holding a bird thereon for feeding through the hole. A shield is located offset from and substantially in front of the hole and in proximity to the perch. The shield preferably has three substantially U-shaped members capable of inhibiting squirrels from eating the bird seed through the hole. A structure is preferably attached between the enclosure and the shield to secure the shield in its offset position.

The shield's three substantially U-shaped members each have a first and a second terminal end. The first terminal end of the first U-shaped member is preferably connected to the first terminal end of the second U-shaped member, and the second terminal end of the second U-shaped member is preferably connected to the first terminal end of the third U-shaped member. Optionally, the second terminal end of the third U-shaped member is connected to the second terminal end of the first U-shaped member.

The shield is preferably offset from the hole a distance sufficient to further inhibit squirrels from eating the bird seed through the hole.

The structure which is attached between the enclosure and the shield to secure the shield in its offset position preferably comprises a first segment attached between the first and second terminal ends of the first U-shaped member, and a second segment attached between the first and second terminal ends of the third U-shaped member. These first and second segments further inhibit a squirrel from accessing the hole in the bird feeder.

The bird feeder optionally also comprises a canopy attached to the enclosure and located above the hole and in proximity to the shield. The canopy further inhibits squirrels from eating the bird seed through the hole, as well as substantially protects the hole from rain.

The bird feeder optionally also comprises an arm, a first terminal portion of which is attached to the enclosure near the hole, a second terminal portion of which is capable of slidable movement over a portion of the hole to restrict the flow of bird seed therethrough.

BRIEF DESCRIPTION OF THE DRAWINGS

FIG. 1 depicts a front view of a first embodiment of a bird feeder having a shield capable of inhibiting squirrels from eating bird seed from a bird feeder.

FIG. 2 depicts a sectional side view of the first embodiment of the bird feeder shown in FIG. 1, taken at section lines 2—2 of FIG. 1.

FIG. 2A depicts a sectional side view of a second embodiment of the bird feeder shown in FIG. 1.

DESCRIPTION OF THE PREFERRED EMBODIMENT(S)

Turning now to FIG. 1, a front view of a first embodiment of a bird feeder having a shield capable of inhibiting squirrels from eating bird seed from a bird feeder is shown.

Enclosure 100 defines the boundaries of a cavity capable of housing bird seed (not shown). Enclosure 100 includes: hole 102 to allow bird seed housed in the cavity to escape therefrom; perch 104 attached to the enclosure and located below the hole capable of allowing a bird to rest thereon while feeding through the hole; shield 106 located offset from and substantially in front of the hole and in proximity to the perch; and a structure attached between the enclosure and the shield to secure the shield in its offset position.

Figure 3:
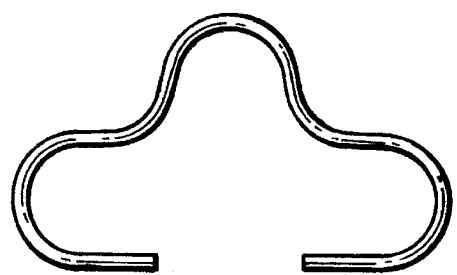
FIG. 3 illustrates a front view of a first embodiment of the shield capable of inhibiting squirrels from eating bird seed from a bird feeder.
Figure 4:
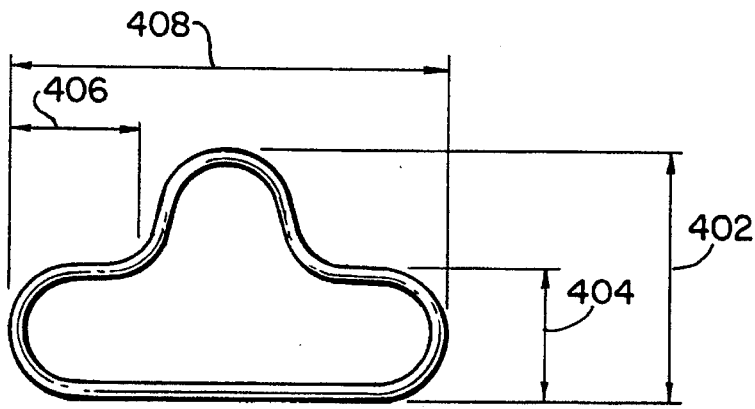
FIG. 4 illustrates a front view of a second embodiment of the shield capable of inhibiting squirrels from eating bird seed from a bird feeder.

Shield 106 preferably comprises three substantially U-shaped members capable of inhibiting squirrels from eating the bird seed through the hole, and two embodiments thereof are shown in FIGS. 3 and 4, respectively.

Two embodiments of the structure which secures the shield in its offset position are illustrated. The first embodiment of the structure is shown in FIGS. 1 and 2 as item 108, and includes vertical segments 110 and 112. Vertical segments 110 and 112 preferably serve two functions.

First, the segments provide a means for securing shield 106 a predetermined distance offset from and substantially in front of the hole.

Second, the segments, in concert with the three substantially U-shaped members of shield 106, inhibit a squirrel from eating any seed from hole 102, as follows (with reference to FIG. 5): a squirrel attempting to gain access to the hole may try to place its mouth over first U-shaped member 502, but will find vertical segment 110 barring access to the hole. Similarly, a squirrel attempting to gain access to the hole by placing its mouth over second U-shaped member 504 will find vertical segment 112 barring access thereto. Attempts to gain access to the hole by placing its mouth only over segment 110 (or 112) will meet with having its chin impeded by segment 112 (or 110).

In the event a squirrel places its mouth over third U-shaped member 506 of the shield, canopy 508 is preferably located thereabove to force the squirrel to place its mouth over the top of canopy 508. Once over the top of the canopy, the squirrel's mouth is not big enough to allow its tongue access to the seeds located in the hole.

However, a bird can gain access to the hole by the opening in the shield provided by third U-shaped member 506, in between the two vertical segments (110 and 112) of structure 108.

Although shield 106 is illustrated as attached behind structure 108, it can be placed in front thereof.

Figure 6:
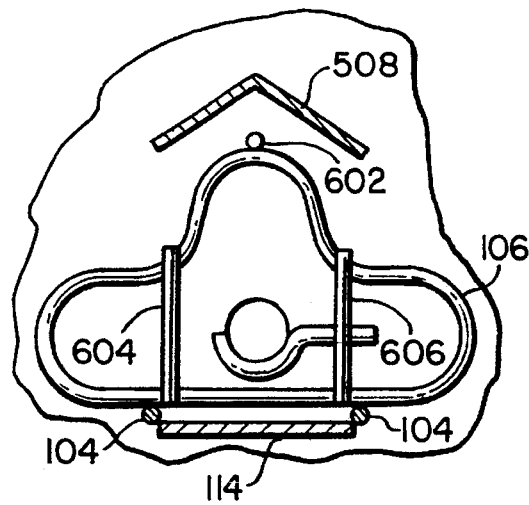
FIG. 6 is an isolated front view of the second embodiment of the bird feeder shown in FIG. 2A, taken at sectional lines 6—6.

Turning now to FIGS. 2A and 6, the second embodiment of the structure which secures the shield in its offset position is illustrated as post 602, which secures the top portion of shield 106 to the enclosure. The bottom portion of the shield is preferably secured in its offset position via attachment to perch 104.

Since the second embodiment of the structure which secures the shield in its offset position does not itself include vertical segments, same are attached directly to the shield, as illustrated by items 604 and 606 (FIG. 6). As above, although items 604 and 606 are shown as attached to the front side of shield 106, they can be attached to the back thereof.

Returning to FIG. 1, the bird feeder of the present invention preferably also comprises tray 114 to hold seed which has fallen from the hole. Additionally, the bird feeder also preferably comprises arm 116.

Figure 5:
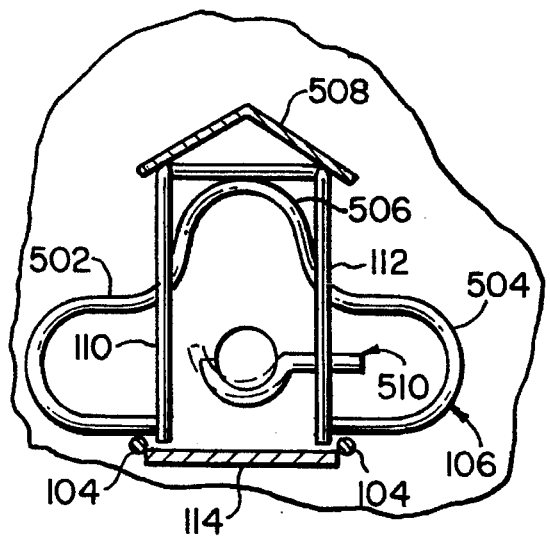
FIG. 5 is an isolated front view of the first embodiment of the bird feeder shown in FIG. 2, taken at sectional lines 5—5.

With reference to FIG. 5, arm 116 preferably comprises a J-shaped hook, a terminal portion of the stem being preferably attached at point 510 to the enclosure near the hole, the hook portion of which is capable of slidable movement over a portion of the hole to restrict the flow of bird seed therethrough.

With reference to FIG. 4, the dimensions (given as outside dimensions, unless otherwise specified) of the shield are preferably as follows: overall height 402: about 1 inch; width 404 of each U-shaped member: about 0.625 inches; height 406 of each U-shaped member: about 0.5 inches; and overall width 408: about 1.875 inches.

Preferably, the spacing between the vertical segments (either 110 and 112, FIG. 5; or 604 and 606, FIG. 6) is about 0.875 inches; the size of hole 102 is about 7/16 ths; the shield is offset from the hole about 0.5 inches (ID); shield 106, structure 108 and arm 116 are preferably manufactured from a 12 gauge copper wire; and canopy has a width of about 1.5 inches and a height of about 0.5 inches.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What I claim as my invention is:

1. A bird feeder comprising:
   an enclosure having a cavity capable of housing bird seed, the enclosure having a hole to allow bird seed housed in the cavity to escape therefrom;
   a perch attached to the enclosure, the perch capable of holding a bird thereon for feeding through the hole;
   a shield located offset from and substantially in front of the hole and in proximity to the perch, the shield having three substantially U-shaped members capable of inhibiting squirrels from eating the bird seed through the hole; and
   a structure attached between the enclosure and the shield to secure the shield in its offset position.

2. The bird feeder of claim 1 further comprising:
   a canopy attached to the enclosure and located above the hole and in proximity to the shield, the canopy to further inhibit squirrels from eating the bird seed through the hole, as well as to substantially protect the hole from rain.

3. The bird feeder of claim 1, wherein each of the three substantially U-shaped members of the shield have a first and a second terminal end, the first terminal end of the first U-shaped member is connected to the first terminal end of the second U-shaped member, and the second terminal end of the second U-shaped member is connected to the first terminal end of the third U-shaped member.

4. The bird feeder of claim 3, wherein the structure comprises:
   a first segment attached between the first and second terminal ends of the first U-shaped member; and
   a second segment attached between the first and second terminal ends of the third U-shaped member.

5. The bird feeder of claim 3, wherein the second terminal end of the third U-shaped member is connected to the second terminal end of the first U-shaped member.

6. The bird feeder of claim 3 further comprising:
   a canopy attached to the enclosure and located above the hole and in proximity to the second U-shaped member of the shield, the canopy to further inhibit squirrels from eating the bird seed through the hole, as well as to substantially protect the hole from rain.

7. The bird feeder of claim 3, wherein the shield further comprises:
   a first segment attached between the first and second terminal ends of the first U-shaped member; and
   a second segment attached between the first and second terminal ends of the third U-shaped member.

8. The bird feeder of claim 1 further comprising an arm, a first terminal portion of which is attached to the enclosure near the hole, a second terminal portion of which is capable of slidable movement over a portion of the hole to restrict the flow of bird seed therethrough.

9. The bird feeder of claim 1, wherein the shield is offset from the hole a distance sufficient to further inhibit squirrels from eating the bird seed through the hole.

10. A bird feeder comprising:
    an enclosure having a cavity capable of housing bird seed, the enclosure having a hole to allow bird seed housed in the cavity to escape therefrom;
    a perch attached to the enclosure, the perch capable of holding a bird thereon for feeding through the hole; and
    a shield located offset from and substantially in front of the hole and in contact with a portion of the perch, the shield having three substantially U-shaped members capable of inhibiting squirrels from eating the bird seed through the hole.

11. The bird feeder of claim 10 further comprising a structure attached between the enclosure and the shield to secure the shield in its offset position.

12. The bird feeder of claim 10 further comprising:

a canopy attached to the enclosure and located above the hole and in proximity to the shield, the canopy to further inhibit squirrels from eating the bird seed through the hole, as well as to substantially protect the hole from rain.

13. The bird feeder of claim 10, wherein each of the three substantially U-shaped members of the shield have a first and a second terminal end, the first terminal end of the first U-shaped member is connected to the first terminal end of the second U-shaped member, and the second terminal end of the second U-shaped member is connected to the first terminal end of the third U-shaped member.

14. The bird feeder of claim 13 further comprising a structure attached between the enclosure and the shield to secure the shield in its offset position, wherein the structure comprises:

a first segment attached between the first and second terminal ends of the first U-shaped member; and a second segment attached between the first and second terminal ends of the third U-shaped member.

15. The bird feeder of claim 13 further comprising:

a canopy attached to the enclosure and located above the hole and in proximity to the second U-shaped member of the shield, the canopy to further inhibit squirrels from eating the bird seed through the hole, as well as to substantially protect the hole from rain.

16. The bird feeder of claim 13, wherein the shield further comprises:

a first segment attached between the first and second terminal ends of the first U-shaped member; and a second segment attached between the first and second terminal ends of the third U-shaped member.

17. The bird feeder of claim 10 further comprising an arm, a first terminal portion of which is attached to the enclosure near the hole, a second terminal portion of which is capable of slidable movement over a portion of the hole to restrict the flow of bird seed therethrough.

18. The bird feeder of claim 10, wherein the shield is offset from the hole a distance sufficient to further inhibit squirrels from eating the bird seed through the hole.

19. The bird feeder of claim 18, wherein the shield is offset approximately 0.5 inches from the hole.

* * * * *